United States Patent [19]

Vourlis

[11] Patent Number: 4,623,599
[45] Date of Patent: Nov. 18, 1986

[54] DOUBLE-GROOVED GASKET FOR GALVANIC CELLS

[75] Inventor: Harry Vourlis, Lakewood, Ohio

[73] Assignee: Union Carbide Corporation, Danbury, Conn.

[21] Appl. No.: 749,544

[22] Filed: Jun. 27, 1985

[51] Int. Cl.[4] .............................................. H01M 2/08
[52] U.S. Cl. .................................... 429/174; 429/185
[58] Field of Search ............... 429/174, 185, 184, 162, 429/163, 171, 172

[56] References Cited

U.S. PATENT DOCUMENTS

| | | | |
|---|---|---|---|
| 3,440,110 | 4/1969 | Arbter | 429/174 X |
| 3,489,616 | 1/1970 | Fangradt et al. | 429/162 |
| 3,615,861 | 10/1971 | Braem | 429/162 |
| 3,713,896 | 1/1973 | Feldhake | 429/174 |
| 3,922,178 | 11/1975 | Winger | 429/172 X |
| 4,107,403 | 8/1978 | Takamura et al. | 429/174 |
| 4,258,108 | 3/1981 | Glaser | 429/162 |

Primary Examiner—Anthony Skapars
Attorney, Agent, or Firm—Cornelius F. O'Brien

[57] ABSTRACT

A galvanic cell employing a gasket made of an electrically non-conducting material and having a groove in each of the upper and lower surfaces. A first cover has a peripheral skirt positioned and secured inside the groove in the upper surface of the gasket and a second cover has a peripheral skirt positioned and secured inside the groove in the lower surface of the gasket thereby providing a sealed cell.

20 Claims, 10 Drawing Figures

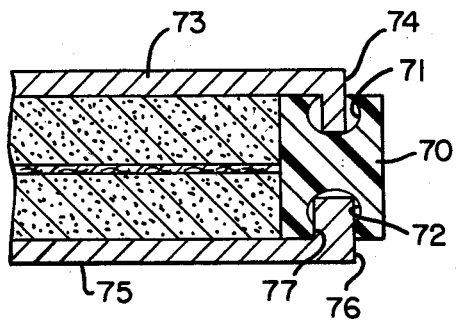
F I G. 8
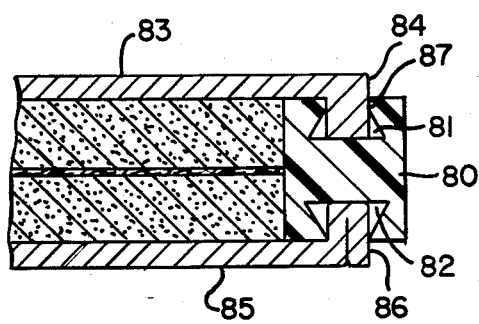
F I G. 9
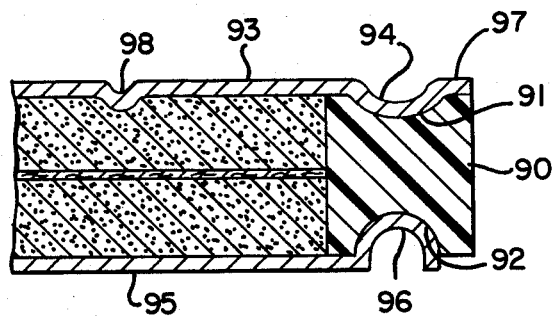
F I G. 10

DOUBLE-GROOVED GASKET FOR GALVANIC CELLS

FIELD OF THE INVENTION

This invention relates to a gasket for sealed galvanic cells.

BACKGROUND OF THE INVENTION

One of the concerns in the manufacture of galvanic cells is that the space inside the cell be optimally utilized. Another concern is that the chemicals inside the cell should not creep through the sealed interface of the cell and leak out of the cell. Yet another concern is that foreign matter should not penetrate the cell through the seal.

The amount of chemicals inside the galvanic cell determines the electrochemical capacity of the cell, therefore it is important to utilize the space effectively. If for some reason the chemicals inside the cell leak, then that leakage may shorten cell life. This leakage can also cause a corrosive deposit to form on the exterior surface of the cell which detracts from the cell's appearance and marketability. Similarly, if foreign matter should enter the cell then such foreign matter may reduce the storage life and electrochemical capacity of the cell.

The chemical leakage which may reduce cell life can also cause corrosive deposits to form on the exterior surface of the cell. These corrosive salts may cause electrical discharge of the cell and may also damage the device in which the cell is housed. Usually the leaking chemical is the cell's electrolyte. This electrolyte leakage can occur in cell systems having aqueous or nonaqueous electrolytes, such as organic solvent-based electrolytes and liquid inorganic cathode-electrolytes, for example those based on thionyl chloride and sulfuryl chloride. Electrolytes such as alkaline electrolytes tend to wet metal surfaces and are known to creep through a sealed interface of a galvanic cell.

Generally, galvanic cells comprise a negative electrode, a positive electrode, a separator between said negative electrode and said positive electrode and an electrolyte solution in ionic contact with the negative and positive electrodes, all housed in a container and cover assembly provided with sealing means, such as a gasket, disposed between the container and cover assembly. The sealing gasket provides a primary barrier to electrolyte leakage. Much effort has been devoted to the design of sealing gaskets.

An example of a gasket disclosed in the art is shown in U.S. Pat. No. 4,457,990 (Gary R. Tucholski) in FIG. 5. The gasket has a peripheral flange and it sits within the container. A cover is then placed over the gasket such that the peripheral edge of the cover fits within the peripheral flange of the gasket. Thereafter, the top edge of the container is radially squeezed against the gasket flange and the cover edge. The top edge of the container is then crimped over the gasket to effectively seal the cover to the container. Because of the location and configuration of the gasket and the cover, less internal volume or space is available for active material. The gasket of this invention specifically addresses this problem and substantially increases the useable internal volume or space for the same external dimensions.

Consequently, it would be a substantial contribution to the art of galvanic cells to provide means for optimizing the space within the cell and to simultaneously provide an effective seal.

Therefore, it is an object of the present invention to provide a sealed galvanic cell wherein the internal volume of the cell is maximized such that a maximum amount of active materials is contained therein.

It is another object of the present invention to provide a substantially leakproof galvanic cell.

A further object of the invention is to provide a galvanic cell with a sealing gasket having a substantially U-shaped groove in each of its upper and lower surfaces.

Another object of this invention is to provide grooves of different cross-sectional shapes in a double-grooved gasket.

Yet another object of this invention is to provide grooves of different sizes in a double-grooved gasket.

The foregoing and additional objects of this invention will become apparent from the following description and accompanying drawings and examples.

DESCRIPTION OF THE INVENTION

The invention relates to a sealed galvanic cell comprising a cell having an anode, an electrolyte and a cathode all assembled in a housing. The housing comprising a first cover member having at least one dependent skirt and a second cover member also having at least one dependent skirt. An electrically non-conductive gasket having a central opening has an upper surface with a groove disposed in the upper surface and a lower surface with a groove disposed in the lower surface of the gasket. The gasket is disposed between the two covers such that the dependent skirt of the first cover member is positioned in the groove in the lower surface of the gasket and the dependent skirt of the second cover member is positioned in the groove in the upper surface of the gasket thereby providing a sealed cell.

Preferably, this invention provides a gasket for galvanic cells wherein the electrically non-conductive gasket has a substantially U-shaped groove in each of its upper and lower surfaces such that a dependent skirt of a cell cover can be tightly fitted (e.g., snapped) into the groove formed by the particular shape of the gasket. For most applications an adhesive and/or sealant is preferably also employed at the cover/gasket junctions.

An adhesive is considered to be a chemical compound or formulation, generally of a fluid or gel nature, capable of wetting the surfaces of counterposed solid articles and providing a durable mechanical bond therebetween. An adhesive layer may be imperfect, containing cracks, voids and/or fissures and may allow the transmission of substances through the interface of the solid article and the adhesive layer and yet be classified as an effective adhesive.

A sealant on the other hand is considered to be a chemical compound or formulation, generally of a fluid or gel nature, capable of wetting the surfaces of counterposed solid articles, completely filling any voids therebetween. A sealant need not provide a mechanical bond but prevents the migration of undesirable substances through the voids it fills.

Well known examples of sealants are polyamides (e.g. see materials specified in U.S. Pat. No. 3,922,178) and asphalt. These materials are not generally adhesives, although some polyamides are tacky and can function as adhesives. Epoxies are typical adhesives but certain ones may also function as sealants. The material currently employed with the double-grooved gasket of this invention is "Eccobond" epoxy which is a registered trademark of Emerson & Cuming, Canton, Mass. The "Eccobond" epoxy can be used as an adhesive as well as a sealant. As a sealant, this epoxy primarily excludes $H_2O$ vapor (its primary function in an all solid state cell). In general, it is imperative that a proper sealant or adhesive be selected depending on the substance that is to be prevented from entering and/or leaving the cell.

In general, the double-grooved gasket of this invention could be applied to a cell containing any of a number of electrochemical systems, e.g., alkaline or nonaqueous, which utilize a thin cell housing. The instant invention is particularly well suited for solid state cell systems, such as $Li/2.5\ LiI\cdot Li_4P_2S_7/TiS_2$, and provides both good seal strength and maximized cell volume utilization for the active materials.

In general, the gasket of this invention is so constructed as to have a groove or recessed channel in each of its upper and lower surfaces. The shape of the grooves in the gasket may be semicircular, circular, elliptical, or polygonal such as triangular, rectangular, trapezoidal or any other shape. The grooves in the gasket as shown in some of the Figures are substantially U-shaped and when aligned vertically provide a substantially H-shaped cross-sectional profile to the gasket.

As shown in all of the Figures, the gasket of this invention has an inner wall inward of the upper and lower surface grooves which forms the central opening. In the assembled cell, the height of this inner wall is the same as the height of the cell housing interior, i.e., the distance between the two cell cover members. The upper and lower portions of the inner gasket wall contact the interior portions of the upper and lower covers, respectively.

The dependent skirt of the cover is preferably disposed at the periphery of the cover as shown in FIG. 1 or could be disposed inwardly from the periphery of the cover as shown in FIG. 2. A requirement for the dependent skirt of the cover is that is should be disposed about an angle of between 30° and 150° to the cover. The preferable angle is 90° or perpendicular to the surface of the cover.

The embodiment shown in FIG. 1 is the preferred construction. The cover edges are snapped in place into the grooves of the gasket to close the cell. The double-folded skirt at the cover edge forms a highly desirable tight snap-fit with the grooved gasket because of the spring-back characteristics of the metal components in that area. Preferably, an adhesive or sealant is also employed.

The gasket could be made out of various polymeric materials, such as polysulfone, polyesters, polyethylene, polypropylene, Tefzel [Tefzel is a trademark of E. I. du Pont de Nemours and Co., Wilmington, Del. and consists of a copolymer of ethylene and tetrafluoroethylene.], or other materials which have low oxygen and water permeability characteristics. The gasket could even be made of ceramic or glass. When used in nonaqueous cell systems the gasket could be made out of a material having low organic solvent vapor permeability. Polyamides, epoxies and other types of sealants compatible with the electrochemical system for which the package is intended may be used. The gasket could also be coated with a polyamide. The cover of the cell when secured within the gasket of this invention, along with a suitable adhesive/sealant will provide a long leakage path and good seal strength in both the peel and shear directions.

An additional benefit that would be derived from the novel cell of this invention is that these cells could be easily assembled or stacked one on top of each other for various battery applications. These cells could also be structurally shaped so that the bottom of one fits snugly over the top of another. These multiple cells could be connected in series through external stack pressure, rather than the conventional intercell weld connections. This could permit the individual cells to have greater energy density and also could permit more volume efficient stacking of the cell.

Another benefit that could be derived from the novel cell of this invention is that the outer structure of these cells can be easily adapted to provide a polarity orientation to the battery, i.e., that the battery goes inside its compartment in one and only one way. One way of accomplishing this is by shaping the gasket of this invention so that once assembled in a battery, the battery can only be placed in an electronic device in one and only one way. Another way to provide the cell with a structurally defined orientation is by shaping the upper or lower cover or the depending skirts so that the battery cannot be inserted incorrectly in its socket or compartment.

The covers are usually snapped inside the double-grooved gasket and are held in place by friction. An adhesive or sealant could also be used to securely hold the covers to the gasket. Laser welding or other similar techniques could be used to join the gasket of this invention to the cover. Use of such a process could provide a hermetic seal.

The cover and the gasket could be made separately and then snapped into each other during the assembly of the cell. It is also possible to have the gasket of this invention molded onto the first cover so that the second cover can then be snapped into this assembly.

The covers for use with the gasket of this invention could be made of an electrically conducting material, such as metal or a conductive polymer. If a non-conductive material is used to make the cover then a provision should be made for an external contact to the electrode.

The double-grooved gasket of this invention could be suitably employed in cell systems, such as cells having aqueous alkaline electrolytes such as $Zn/KOH/MnO_2$, $Zn/KOH/Ag_2O$, $Zn/NaOH/Ag_2O$ and $Zn/KOH/HgO$ cells. Nonaqueous cells having organic electrolytes based on solvents such as propylene carbonate, dimethoxyethane, dioxolane, $\gamma$-butyrolactone, alkyl-substituted cyclic ethers such as 2-methyl tetrahydrofuran, and the like, including mixtures thereof, with solutes such as $LiCF_3SO_3$, $LiAsF_6$, $LiBF_4$, $LiClO_4$, etc. and electrode pairs such as $Li/MnO_2$, $Li/CF_x$, $Li/TiS_2$ and others well known in the art may also utilize the subject double-grooved gasket construction.

BRIEF DESCRIPTION OF DRAWINGS

The present invention will become apparent from the following description thereof when considered together with the accompanying drawings which are set forth as being exemplary of the embodiments of the present invention and are not intended in any way, to be limitative thereof and wherein:

FIG. 8 is a partial elevational view of the cross-section of an eighth embodiment made in accordance with this invention.

FIG. 9 is a partial elevational view of the cross-section of a ninth embodiment made in accordance with this invention.

FIG. 10 is a partial elevational view of the cross-section of a tenth embodiment made in accordance with this invention.

DETAILED DESCRIPTION OF DRAWINGS

Referring to FIGS. 1 through 10, there are shown different embodiments of the double-grooved gasket made in accordance with this invention.

Figure 1:
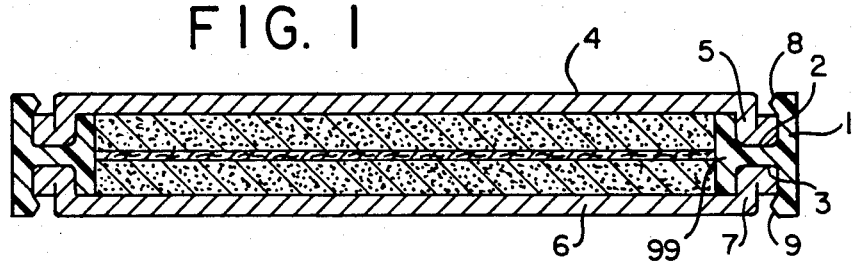
FIG. 1 is an elevational view of the cross-section of the preferred embodiment made in accordance with this invention.

A preferred embodiment of the gasket made in accordance with the invention is shown in FIG. 1. The gasket 1 made of an electrically non-conductive material has a substantially U-shaped groove 2 in its upper surface and a substantially U-shaped groove 3 in its lower surface. The gasket inner wall 99 is inward of grooves 2 and 3 and forms the central opening of the gasket. The outer wall of the gasket 1 has inward projections 8 and 9 at its upstanding inner surface. The upper cover 4 has a peripheral dependent skirt 5. The skirt 5 is folded upon itself and is approximately at a right angle to cover 4. Similarly, the lower cover 6 has a peripheral dependent skirt 7 which is also folded upon itself. In an assembled state, the skirt 5 is inserted into upper groove 2, while the projection 8 extends over the periphery of the cover 4. The groove 3 accepts and securely holds the lower skirt 7, while the projection 9 extends over the periphery of the cover 6. Gasket inner wall 99 has a height equal to the height of the cell housing interior. The upper portion of inner wall 99 contacts the interior of cover 4 and the lower portion of inner wall 99 contacts the interior of cover 6. An inwardly projecting dimple may be added to the upper or lower or both covers to provide a superior contact between the cover and the adjacent active material.

Figure 2:
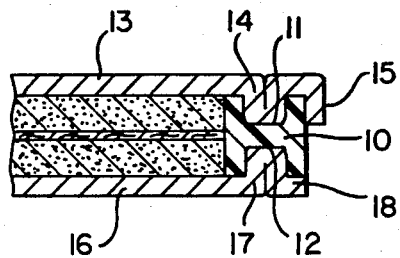
FIG. 2 is a partial elevational view of the cross-section of a second embodiment made in accordance with this invention.

FIG. 2 discloses another embodiment of the gasket made in accordance with this invention. The gasket 10 is made of an electrically non-conducting material such that its upper surface has a substantially U-shaped groove 11, and its lower surface has a substantially U-shaped groove 12. The cover 13 has two skirts or flanges 14 and 15. The skirt 14 is an inner skirt and has a refolded portion so that additional strength and surface contact area are provided to the inner skirt 14. The second skirt of the cover 13 is the peripheral dependent skirt or flange 15. The bottom cover 16 has an inner skirt 17 and could have a peripheral skirt, which is not shown here, but which may be preferred for certain applications. The cover 16 as shown terminates with a lip 18 at its peripheral edge. The inner skirt 14 is assembled inside the substantially U-shaped groove 11, while the peripheral skirt 15 hangs over the outer edge of the gasket 10. Similarly, the inner skirt 17 is positioned inside the substantially U-shaped groove 12. The flange 15 maybe used to provide polarity orientation to the completed cell. This may be accomplished by providing the electronic device with a female portion or compartment for the placement of a battery whose contours match the bottom contours of the cell and perhaps the side contours of the cell, so that the cell can be placed in a nesting position inside the female portion or compartment or cavity of the electronic device. The flange 15 enables the battery or cell to be placed inside the female portion or compartment in one and only one way thus insuring device protection as well as fixing the polarity orientation.

Figure 3:
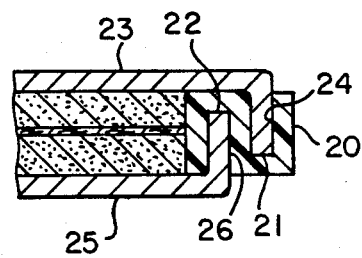
FIG. 3 is a partial elevational view of the cross-section of a third embodiment made in accordance with this invention.

Another embodiment of the gasket made in accordance with the present invention is shown in FIG. 3. The gasket 20 made of an electrically non-conducting material has a substantially U-shaped groove 21 in its upper surface and a substantially U-shaped groove 22 in its lower surface. The two U-shaped grooves 21 and 22 of the gasket 20 are disposed in such a manner that the grooves 21 and 22 are parallel to each other. The cover 23 has a peripheral dependent skirt 24, while the cover 25 has a peripheral dependent skirt 26. During the assembly of the galvanic cell the peripheral skirt 24 is inserted into the groove 21 and is securely hel therein. Groove 22 accepts and securely holds skirt 26 of the cover 25. The asymmetry of the cell may be used to provide polarity orientation to the completed cell. This is accomplished by providing the electronic device with a socket or compartment or cavity that is physically structured so that the cell or battery as shown in FIG. 3 can be placed inside the socket or compartment in one and only one way.

Figure 4:
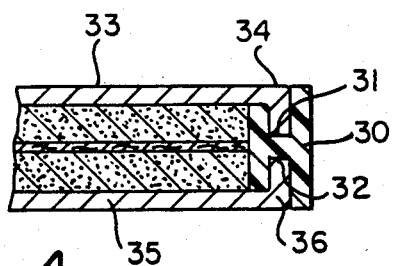
FIG. 4 is a partial elevational view of the cross-section of a fourth embodiment made in accordance with this invention.

FIG. 4 shows yet another embodiment of the gasket made in accordance with the present invention. The gasket 30 made of an electrically insulating material has a substantially U-shaped groove 31 in its upper surface and a substantially U-shaped groove 32 in its lower surface. The cover 33 has a peripheral dependent skirt 34, which is approximately at a right angle to the cover 33. The cover 35 has a peripheral dependent skirt 36 which is disposed substantially perpendicular to the cover 35. The grooves 31 and 32 of the gasket 30 mate with the peripheral dependent skirts 34 and 36 respectively.

Figure 5:
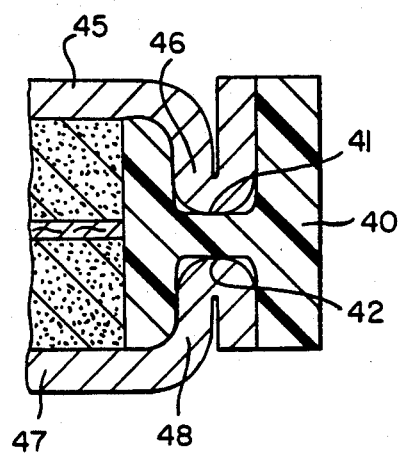
FIG. 5 is a partial elevational view of the cross-section of a fifth embodiment made in accordance with this invention.

Specifically, FIG. 5 illustrates one of the embodiments of the invention and shows gasket 40 which is made of an electrically non-conducting material having a substantially U-shaped groove 41 in its upper surface and a substantially U-shaped groove 42 in its lower surface. Cover 45 has a peripheral dependent skirt or flange 46 which has a refolded portion approximately at a right angle to the plane of the cover 45. The added fold to the peripheral dependent skirt 46 gives the skirt additional strength as well as an additional contact area. The second cover 47 of the galvanic cells has a peripheral dependent skirt or flange 48 which has a refolded portion approximately at a right angle to the cover 47. The peripheral dependent skirt 46 is snapped and securely held inside the substantially U-shaped groove 41, while the lower peripheral dependent skirt 48 is held inside the substantially U-shaped groove 42 in a similar manner. The asymmetry of the cell may be used to provide polarity orientation to the completed cell. This may be accomplished by providing the electronic device with a cavity or compartment or a female portion that is structured so that the cell or battery as shown in FIG. 5 can be placed inside the socket or compartment in one and only one way. The outer fold of the skirt 48 may be made so that it is equal in length to the outer portion of the gasket 40.

Figure 6:
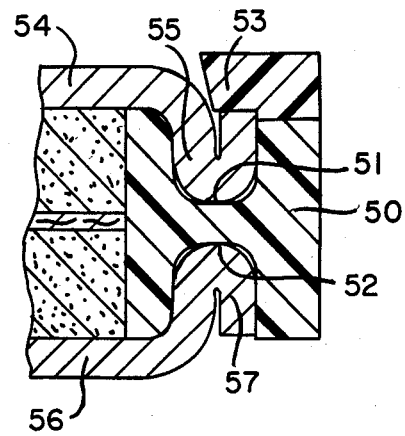
FIG. 6 is a partial elevational view of the cross-section of a sixth embodiment made in accordance with this invention.

FIG. 6 shows another embodiment of the gasket made in accordance with this invention. The gasket 50 made of electrically insulating material has a substantially U-shaped groove 51 in its upper surface and a substantially U-shaped groove 52 in its lower surface. The cover 54 has a peripheral dependent skirt 55 which is refolded approximately at a right angle to the cover 54. A second cover 56 of the galvanic cell is a mirror image of the cover 54. The upper U-shaped groove 51 and the lower U-shaped groove 52 mate with and securely hold the peripheral dependent skirts 55 and 57, respectively. An additional electrically non-conductive member 53 may be mounted or adhered to the upper surface of the gasket 50 and it may extend over the peripheral edge of the cover 54. The member 53 may be attached to the peripheral edge of the cover 54 or it may be bonded to the outer surface of the gasket 50. When the electrically non-conductive member 53 is attached, by any suitable means, to the outer upper surface of the gasket 50 it may be on the same plane as the upper surface of the cover 54 or it may be above the upper surface of the cover 54. When the member 53 protrudes above the upper surface of the cover 54, it provides a polarity orientation to the cell or battery, i.e., that the cell or the battery can now be placed inside a cavity or a compartment of the electronic device in one and only one way. The peripheral outer surface of the gasket 50 may be in the same plane as that of the member 53. A similar electrically non-conductive member can also be mounted to the lower surface of the gasket 50. If an electrically non-conducting member is not attached to the lower surface of the gasket 50, then the asymmetry of the cell may be used to provide a polarity orientation to the battery or cell. The asymmetry shown in FIG. 6 provides a nesting geometry for stacking of cells. This type of stacking insures uniform polarity alignment of the cells in the stack.

Figure 7:
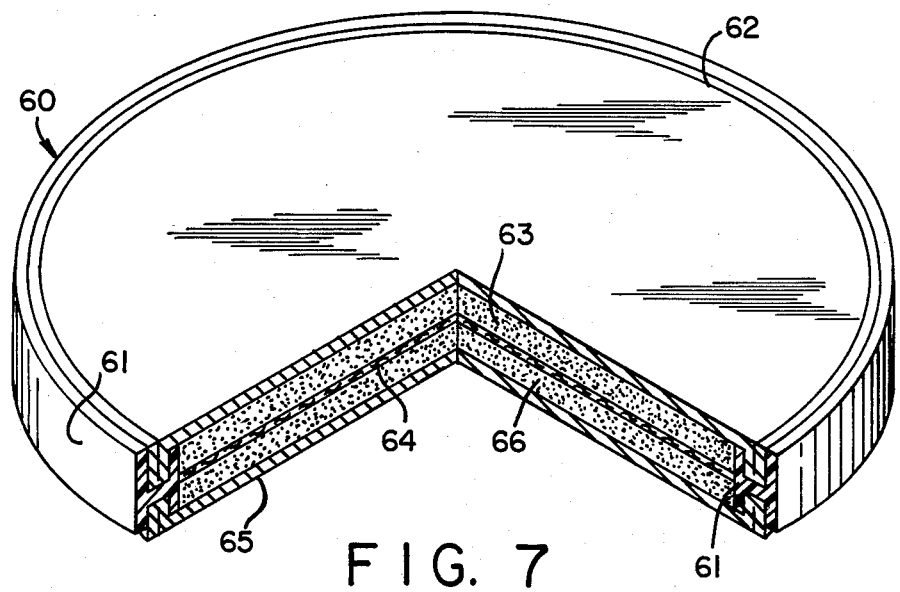
FIG. 7 is a sectional perspective view of an assembled galvanic cell showing a seventh embodiment of the gasket made in accordance with this invention.

A sectional perspective view of an assembled galvanic cell showing one embodiment in its assembled state is shown in FIG. 7. The assembled galvanic cell 60 comprises gasket 61 and covers 62 and 65. Disposed between covers 62 and 65 is the electrically non-conductive gasket 61 having a substantially U-shaped groove in its upper and lower surfaces. The sealing surface of the cover 62 is disposed in interfacial sealing contact with the groove in the upper surface of the gasket 61, while the sealing surface of the cover 65 is disposed in interfacial sealing contact with the groove in the lower surface of the gasket 61. Disposed within the cover 62 and in electrical contact therewith is anode 63, thereby adapting a least a portion of cover 62 as the anodic terminal of the galvanic cell. Disposed within cover 65 and in electrical contact therewith is cathode 66, thereby adapting at least a portion of cover 65 as the cathodic terminal of the galvanic cell. Anode 63 is separated from cathode 66 by electrolyte 64. A separator between the anode and the cathode may be used, if desired. The asymmetry of the gasket 61 may be used to provide polarity orientation to the cell. This is accomplished by providing in the electronic device a cavity or a compartment having a contour which matches the bottom contours of the cells 60 so that the cell 60 can be placed inside the compartment in one and only one way. The cell having such a contour insures device protection because the polarity orientation is fixed. Although the cell shown in FIG. 7 has a cylindrical shape, the same construction features may be applied to a cell having a rectangular prismatic shape.

FIG. 8 shows another embodiment of the gasket made in accordance with the present invention. The gasket 70 has a partially circular shaped groove 71 in its upper surface and a partially circular shaped groove 72 in its lower surface. The groove 71 or 72 could have the same or different cross-sectional area. The cover 73 has a peripheral dependent skirt 74. The skirt 74 is inserted into the groove 71 and it is securely held therein preferably by an adhesive or a sealant. The excess space in the groove 71 may be used as a sealant or an adhesive reservoir. The second cover 75 has a peripheral dependent skirt 76 which is securely inserted into the groove 72 and is securely held therein preferably by an adhesive or sealant. The groove 72 has a flat area 77 in order to provide a better contact to the skirt 76.

Yet another embodiment of the gasket made in accordance with the present invention is shown in FIG. 9. The gasket 80 has two substantially triangular grooves 81 and 82. Groove 81 is disposed in the upper surface of the gasket 80, while the groove 82 is disposed in the lower surface of the gasket 80. The cover 83 has a dependent skirt 84 which is inserted into groove 81 and is securely held therein preferably by a suitable sealant or an adhesive. Groove 81 has a flat portion 87 which is used to provide a better direct contact to the skirt 84. The cover 85 has a peripheral dependent skirt or flange 86 which has a refolded portion approximately at a right angle to the plane of the cover 85. The groove 82 accommodates the skirt 86 and said skirt 86 is held securely therein preferably by a suitable sealant and/or an adhesive. The extra space in grooves 81 and 82 may act as an adhesive or sealant reservoir.

Another embodiment of the gasket made in accordance with the present invention is shown in FIG. 10. The gasket 90 has a substantially semicircular shaped groove 91 disposed in its upper surface and a substantially U-shaped groove 92 disposed in its lower surface. The cover 93 has a dependent skirt 94 and a lip 97. An inwardly projecting dimple 98 is added to the cover 93 to provide a superior contact to the adjacent active material. The skirt 94 is inserted into the groove 91 and is securely held therein, preferably by a suitable adhesive and/or sealant. The cover 95 has a dependent skirt 96. The skirt 96 has a cross-sectional profile which is substantially semicircular. The skirt 96 snaps into the groove 92 and is securely held therein preferably by a suitable sealant or an adhesive.

EXAMPLES

The following examples are intended to further illustrate the invention and are not intended to limit the scope of the invention in any manner.

EXAMPLE 1

Solid state galvanic cells utilizing the double-grooved gasket and the Li/2.5LiI·Li$_4$P$_2$S$_7$/TiS$_2$ electrochemical system have been constructed. Each cell contained a lithium anode (foil), a TiS$_2$ cathode pellet, and the 2.5LiI·Li$_4$P$_2$S$_7$ solid electrolyte. This electrolyte has been disclosed in U.S. Pat. No. 4,331,750. Between the anode and the cathode was a layer of the previously stated solid electrolyte. The inner surface of the cover which was in contact with the cathode pellet has a conductive carbon coating and the cover in contact with the anode had an expanded metal layer welded to its inner surface. In order to insure good electrode-electrolyte interfaces, the isostatic compression technique of U.S. Pat. No. 4,477,545 was employed to build the preassemblies (anode/solid electrolyte/cathode).

Two sets of solid state batteries that utilized the above-described electrochemical system were assembled with the double-grooved gasket of FIG. 1. The double-grooved gasket was made from polypropylene. The cell cover was made of a 304 stainless steel/nickel bi-clad material. One lot was made with a small concave dimple stamped into each negative cover prior to cell assembly. During the adhesive sealing of the cell's covers to the gasket, vertical pressure was used to compress the cell. A second lot was made with flat cell covers. In both lots, the covers and the gaskets were pre-cleaned with plasma treatment according to methods well known to those skilled in the art. The covers were bonded to the gasket with Eccobond 45 epoxy manufactured by Emerson and Cuming Co. The cells were designed with 57 mAhr each of anode and cathode capacities. Upon discharge no electrolyte leakage was observed. The appearance of the cell did not change and there was no observance of any gassing or bulging of the cell.

The following table shows the type of service that was obtained when the above-described cells were service tested on a 15,000 ohm continuous load at 21° C.

TABLE I

| Cell Construction | mAhr Input | mAhr Output | % Efficiency |
|---|---|---|---|
| Double-grooved gasket with flat covers | 57 | 40 | 70.2 |
| Double-grooved gasket with a dimple in the negative cover | 57 | 48 | 84.2 |

The increase in efficiency from 70.2% to 84.2% can be attributed to the improved contact that is provided by incorporating a dimple into the negative cover and providing vertical pressure durng the adhesive sealing of the cell. Percent efficiency is defined as the milliampere-hour output divided by the milliampere-hour input and the result is then multiplied by 100.

EXAMPLE 2

It was also discovered that by using the double-grooved gasket of this invention the cover thickness could be reduced thereby further increasing the useable internal volume available for the active material. One reason was that the flange or skirt of the cover was at a right angle to the cover whereby an additional cover space was made available to the active material. Another reason is that covers disclosed in the art, such as disclosed in U.S. Pat. No. 4,457,990 (Gary R. Tucholski), have to be radially compressed in order to seal the cell, therefore, these covers have to be at least 0.010 inch (0.254 mm) thick in order to withstand the inherent bowing that is caused by the radial compression. When the covers are used with the double-grooved gasket of this invention, there are no radial forces, therefore the covers can be made thinner. As shown in Table II, there was an increase in useable internal volume by reducing the cover thickness from 0.254 mm (0.010 inch) to 0.152 mm (0.006 inch).

TABLE II

| Seal Construction (cover thickness) | Useable Internal Diameter | Useable Internal Height | Useable Internal Volume (Cm$^3$) |
|---|---|---|---|
| Double groove (0.254 mm) | 17.96 mm | 1.07 mm | 0.27 |
| Double groove (0.152 mm) | 17.96 mm | 1.27 mm | 0.32 |

It is to be understood that modifications may be made to the above specification without departing from the spirit of the invention as set forth in the appended claims. Such modifications are within the scope of this invention, for example, the thickness of one of the covers could be different from that of the other cover and/or the diameter of one of the covers could be different from that of the other cover.

What is claimed is:

1. A galvanic cell having an anode, an electrolyte and a cathode assembled in a sealed cell housing, said housing comprising,
   (a) a first cover member having at least one dependent skirt;
   (b) a second cover member having at least one dependent skirt;
   (c) an electrically non-conductive gasket having a central opening, an upper surface with a groove disposed in said upper surface, a lower surface with a groove disposed in said lower surface, and an inner wall inward of the upper and lower surface grooves defining said central opening;
   said dependent skirt of said first cover member being positioned in said groove in said lower surface of said gasket, said dependent skirt of said second cover member being positioned in said groove in said upper surface of said gasket and, said inner wall of said gasket contacting the interior portions of both of said cover members and having a height equal to the distance between said cover members in the interior of said cell housing.

2. The galvanic cell of claim 1 wherein said gasket material is selected from the group consisting of polysulfone, polyethylene, polyesters, polypropylene and copolymer of ethylene and tetrafluoroethylene.

3. The galvanic cells of claim 1 wherein at least one of said cover members has a peripheral skirt having a refolded portion so as to provide double thickness.

4. The galvanic cell of claim 1 wherein the diameter of said first cover member is smaller than the diameter of said second cover member.

5. The galvanic cell of claim 1 wherein said first cover member is in contact with an anodic material and is adapted as an anodic terminal and said second cover member is in contact with a cathodic material and is adapted as a cathodic terminal.

6. The galvanic cell of claim 1 wherein said cell has a cylindrical shape.

7. The galvanic cell of claim 1 wherein said cell has a rectangular prismatic shape.

8. The galvanic cell of claim 1 wherein said gasket has an additional electrically non-conductive member mounted on the outer portion of the upper surface of said gasket such that said additional electrically non-conductive member extends over the peripheral edge of the dependent skirt of said second cover member positioned in the groove of said upper surface.

9. The galvanic cell of claim 1 wherein a suitable sealant material is used at the skirt-gasket junction to tightly seal said cell.

10. The galvanic cell of claim 9 wherein said sealant material is selected from the group consisting of asphalt, polyamides, and epoxies.

11. The galvanic cell of claim 1 wherein a suitable adhesive material is used at the skirt-gasket junction to tightly seal said cell.

12. The galvanic cell of claim 11 wherein said adhesive material is selected from the group consisting of polyamides and epoxies.

13. The galvanic cell of claim 1 wherein a first skirt of said first cover member is positioned inside and secured within at least one of said groove of said gasket while a second skirt of said first cover member extends onto and over the outer wall of said gasket.

14. The galvanic cell of claim 13 wherein said skirts are substantially parallel to each other.

15. The galvanic cell of claim 1 wherein said gasket is coated with a polyamide.

16. The galvanic cell of claim 1 wherein the cross-sectional area of said groove disposed in said upper surface of said gasket is different than the cross-sectional area of said groove disposed in said lower surface of said gasket.

17. The galvanic cell of claim 1 wherein the cross-sectional shape of at least one of said grooves of said gasket is a polygon.

18. The galvanic cell of claim 1 wherein the cross-sectional shape of at least one of said grooves of said gasket is an ellipsoid.

19. The galvanic cell of claim 1 wherein the thickness of one of the cover members is different than the thickness of the other cover member.

20. The galvanic cell of claim 1 wherein at least one cover member has an upwardly projecting dimple.

* * * * *